(12) United States Patent
Kuppan et al.

(10) Patent No.: US 10,118,700 B2
(45) Date of Patent: Nov. 6, 2018

(54) SMA ACTUATED RESTRAINT ASSEMBLY

(71) Applicant: GOODRICH CORPORATION, Charlotte, NC (US)

(72) Inventors: Skandan Berikai Kuppan, Karnataka (IN); Chana Kesava Reddy, Hyderabad (IN); Bharath Marappan, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 8 days.

(21) Appl. No.: 15/371,403

(22) Filed: Dec. 7, 2016

(65) Prior Publication Data

US 2018/0099749 A1 Apr. 12, 2018

(30) Foreign Application Priority Data

Oct. 12, 2016 (IN) .............................. 201611034788

(51) Int. Cl.
*B60P 7/08* (2006.01)
*B64D 9/00* (2006.01)
*F03G 7/06* (2006.01)

(52) U.S. Cl.
CPC ............ *B64D 9/003* (2013.01); *B60P 7/0838* (2013.01); *F03G 7/065* (2013.01)

(58) Field of Classification Search
CPC .. B64D 9/00; B60P 7/0838; B60P 7/13; B60P 7/0892; F03G 7/065; F03G 7/06
USPC ............ 410/69, 77–80, 94; 244/118.1, 137.1
See application file for complete search history.

(56) References Cited

U.S. PATENT DOCUMENTS

| | | | |
|---|---|---|---|
| 5,095,595 A | 3/1992 | Stella et al. | |
| 7,556,313 B2 | 7/2009 | Browne et al. | |
| 7,731,460 B2 | 6/2010 | Brown et al. | |
| 7,883,148 B2 | 2/2011 | Alexander et al. | |
| 7,896,593 B2 * | 3/2011 | Brewster | B60P 7/132 410/69 |
| 8,066,459 B2 * | 11/2011 | Schulze | B64D 9/003 410/77 |
| 8,201,850 B2 | 6/2012 | Browne et al. | |
| 8,209,976 B2 | 7/2012 | Vaidyanathan et al. | |
| 8,662,443 B2 | 3/2014 | Gunter et al. | |
| 8,894,142 B2 | 11/2014 | Alexander et al. | |
| 2013/0121782 A1 * | 5/2013 | Schulze | B64D 9/003 410/80 |
| 2015/0330118 A1 | 11/2015 | Alexander et al. | |

FOREIGN PATENT DOCUMENTS

WO 2005014439 A1 2/2005

* cited by examiner

*Primary Examiner* — Stephen T Gordon
(74) *Attorney, Agent, or Firm* — Cantor Colburn LLP

(57) ABSTRACT

A restraint assembly includes a base member, a pawl, a lock member, and an actuator assembly. The base member has a first side plate spaced apart from a second side plate. The pawl is pivotally coupled to the first side plate and the second side plate by a first pin. The lock member is pivotally coupled to the first side plate and the second side plate by a second pin. The actuator assembly includes a first shape memory alloy actuator that is drivably connected to the pawl and a second shape memory alloy actuator that is drivably connected to the lock member.

12 Claims, 4 Drawing Sheets

SMA ACTUATED RESTRAINT ASSEMBLY

CROSS-REFERENCE TO RELATED APPLICATIONS

This application claims the benefit of Indian application no. 201611034788 filed Oct. 12, 2016, which is incorporated herein by reference in its entirety.

BACKGROUND

Cargo systems require restraint assemblies that secures cargo within an aircraft, a ULD, a container, a pallet, or the like. An operator manually locks and unlocks the restraint assembly to enable the movement of ULD's, loading, or unloading of cargo inside of an aircraft cargo bay. The manual locking and unlocking of the restraint assembly may be a time-consuming process and laborious process.

BRIEF DESCRIPTION

According to an embodiment of the present disclosure, a restraint assembly is provided. The restraint assembly includes a base member, a pawl, a lock member, and an actuator assembly. The base member has a first side plate spaced apart from a second side plate. The first side plate and the second side plate extend from a floor of the base member. The pawl is pivotally coupled to the first side plate and the second side plate by a first pin. The lock member is spaced apart from the pawl. The lock member is pivotally coupled to the first side plate and the second side plate by a second pin. The actuator assembly includes a first shape memory alloy actuator and a second shape memory alloy actuator. The first shape memory alloy actuator is drivably connected to the pawl. The second shape memory alloy actuator is drivably connected to the lock member.

According to another embodiment of the present disclosure, a restraint assembly is provided. The restraint assembly includes a base member, a pawl, a lock member, and an actuator assembly. The base member has a floor, a first side plate extending from the floor, and a second side plate extending from the floor. The pawl has a pawl body, a first shoulder extending from the pawl body and pivotally connected to the first side plate, and a second shoulder extending from the pawl body and pivotally connected to the second side plate. The lock member is pivotally connected to the first side plate and the second side plate. The actuator assembly is drivably connected to the pawl and the lock member. The actuator assembly is arranged to move each of the pawl and the lock member between a retracted position and an extended position.

According to yet another embodiment of the present disclosure, a restraint assembly is provided. The restraint assembly includes a pawl, a lock member, and an actuator assembly. The pawl has a pawl body, a first shoulder and a second shoulder extending from the pawl body. The first shoulder and the second shoulder are pivotally connected to the base member by a first pin. The lock member has a lock member base, a first arm and a second arm extending from the lock member base. The lock member is pivotally connected to the base member by a second pin. The actuator assembly is drivably connected to the pawl and the lock member. The actuator assembly is arranged to move each of the pawl and the lock member between a retracted position and an extended position.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus is presented herein by way of exemplification and not limitation with reference to the Figures. It is to be understood that the disclosed embodiments are merely illustrative of the invention that is embodied in various and alternative forms. The figures are not necessarily to scale; some features are exaggerated or minimized to show details of particular components. Therefore, specific structural and functional details disclosed herein are not to be interpreted as limiting, but merely as a representative basis for teaching one skilled in the art to variously employ the present invention.

Figure 1:
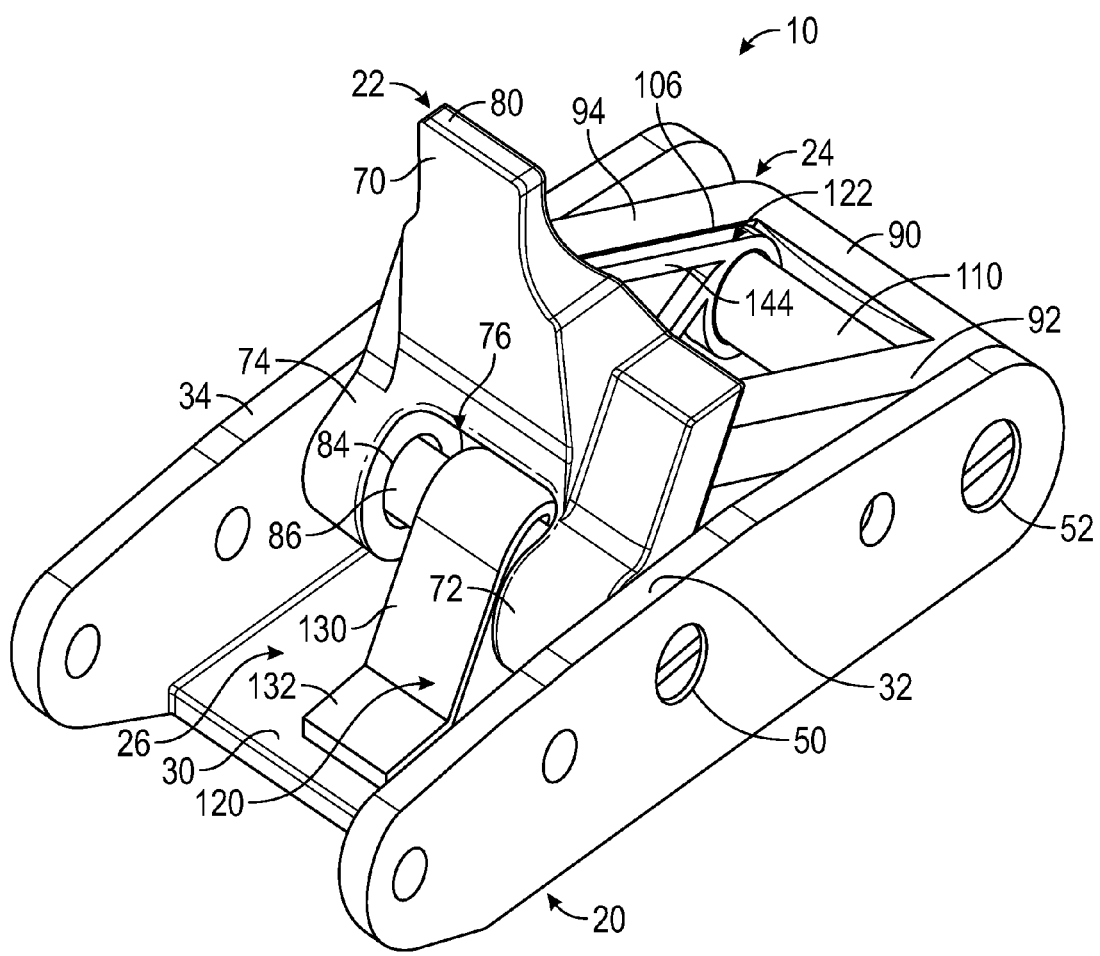
FIG. 1 is a perspective view of a restraint assembly.
Figure 2:
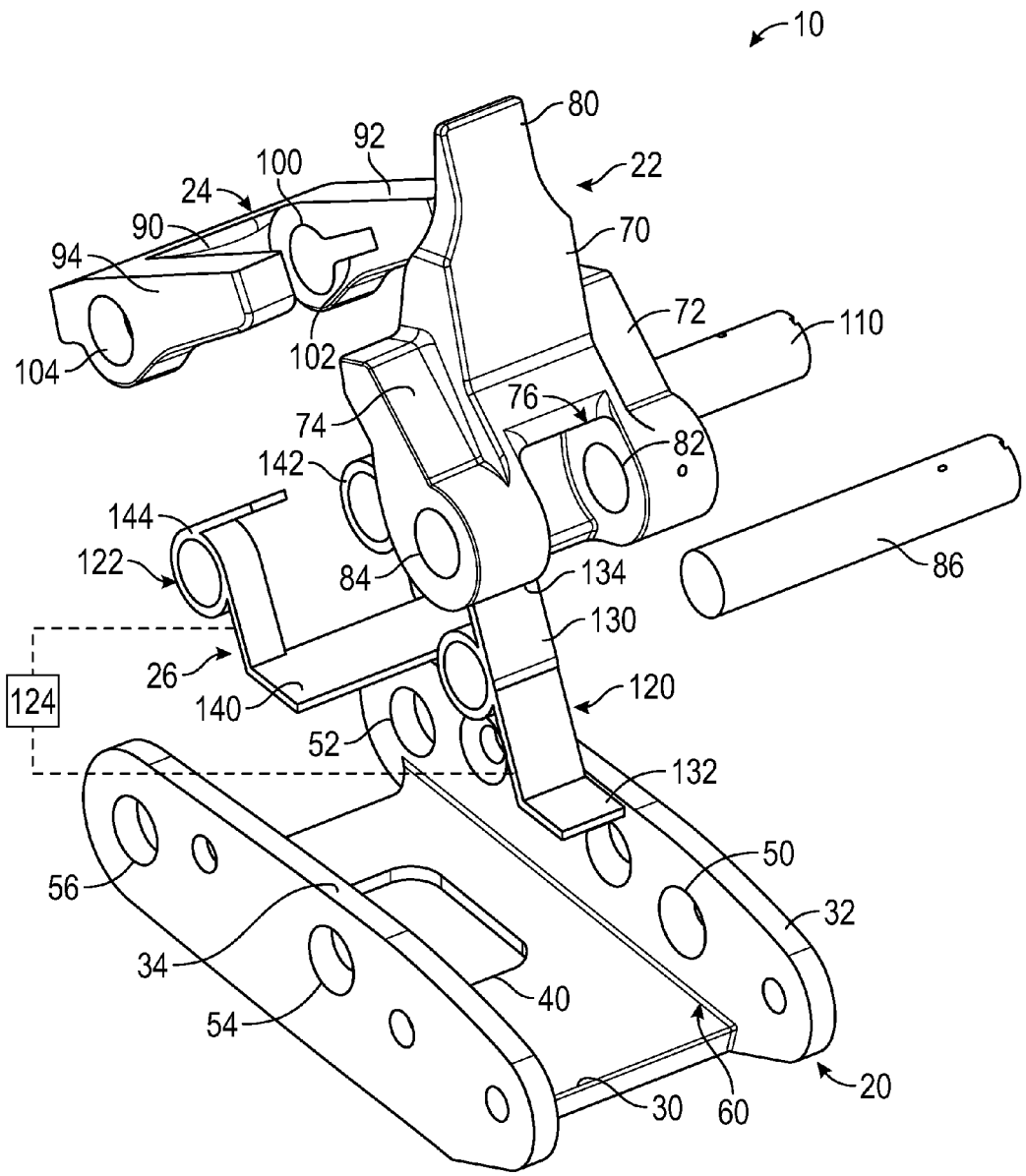
FIG. 2 is a disassembled view of the restraint assembly.

Referring to FIGS. 1 and 2, a restraint assembly 10 is illustrated. The restraint assembly 10 is provided with a transport vehicle such as an aircraft having a loading deck, a trailer, a shipping container, a pallet, a ULD, or the like. The restraint assembly 10 is configured to releasably secure cargo or a pallet within the transport vehicle. The restraint assembly 10 includes a base member 20, a pawl 22, a lock member 24, and an actuator assembly 26.

The base member 20 is configured to operatively connect the restraint assembly 10 to the transport vehicle. The base member 20 includes a floor 30, a first side plate 32, and a second side plate 34. The floor 30 is generally planar and defines a central opening 40. The central opening 40 may extend completely through the floor 30. The central opening 40 may have any shape such as a generally rectangular shape as shown in FIG. 2, as well as other shapes.

The first side plate 32 extends from the floor 30. The first side plate 32 is disposed substantially perpendicular to the floor 30 and is spaced apart from the central opening 40. The first side plate 32 defines a first pin opening 50 and a second pin opening 52 spaced apart from the first pin opening 50. The first pin opening 50 and the second pin opening 52 extend completely through the first side plate 32. The second pin opening 52 is disposed within a portion of the first side plate 32 that extends beyond the floor 30.

The second side plate 34 is spaced apart from the first side plate 32. The second side plate 34 is disposed substantially parallel to the first side plate 32 and is disposed substantially perpendicular to the floor 30. The second side plate 34 is spaced apart from the central opening 40. The second side plate 34 defines a third pin opening 54 and the fourth pin opening 56 spaced apart from the third pin opening 54. The fourth pin opening 56 is disposed within a portion of the second side plate 34 that extends beyond the floor 30. The third pin opening 54 and the fourth pin opening 56 extend completely through the second side plate 34. The third pin opening 54 is proximately aligned with the first pin opening 50 such that they are disposed substantially coaxially or concentrically. The fourth pin opening 56 is proximately aligned with the second pin opening 52 such that they are disposed substantially coaxially or concentrically.

The floor 30, the first side plate 32, and the second side plate 34 define a receiving region 60.

Figure 3:
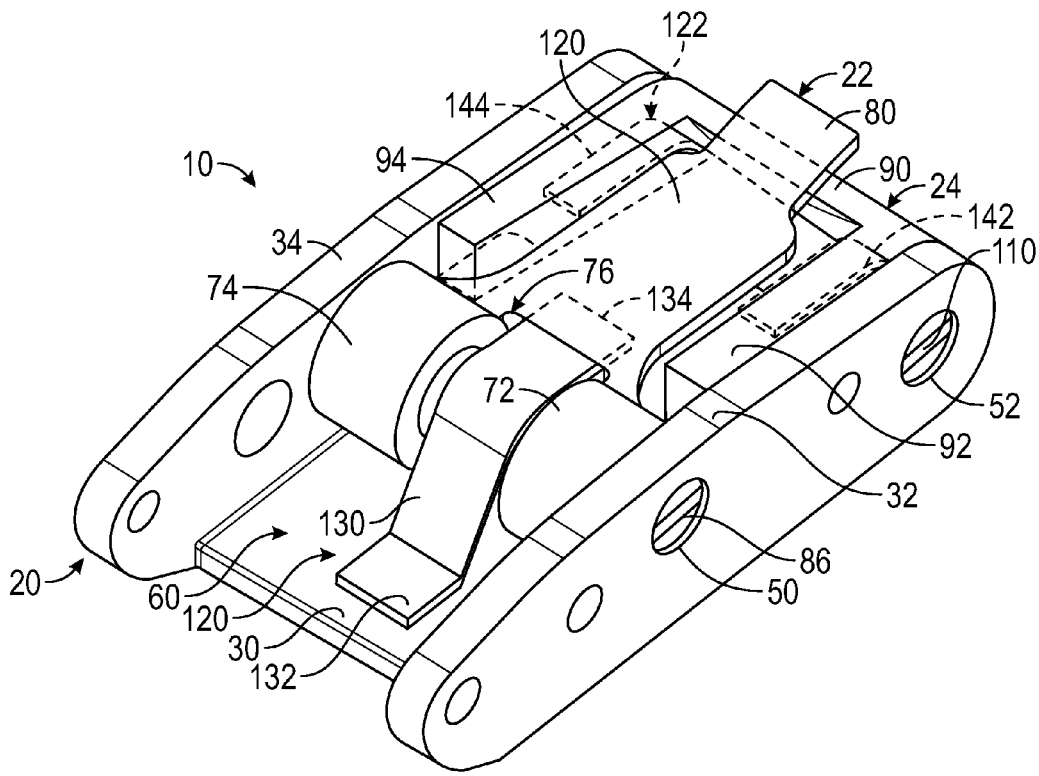
FIG. 3 a perspective view of the restraint assembly in a retracted position.
Figure 5:
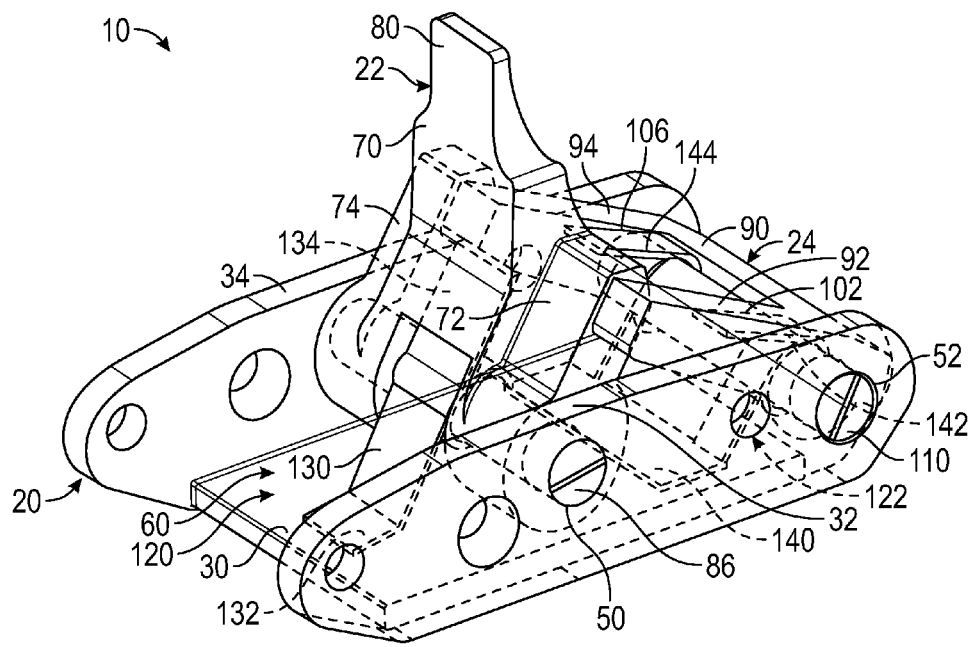
FIG. 5 is a perspective view of the restraint assembly in an extended position.

The pawl 22 is pivotally connected to the base member 20. The pawl 22 is disposed between the first side plate 32 and the second side plate 34. The pawl 22 is movable between a retracted position, as shown in FIG. 3, in which a majority of the pawl 22 is received within or disposed within the receiving region 60, and an extended position, as shown in FIGS. 1 and 5, in which the majority of the pawl 22 is disposed outside of the receiving region 60 and the pawl 22 is disposed generally perpendicular to the floor 30 of the base member 20.

The pawl 22 includes a pawl body 70, a first shoulder 72, and a second shoulder 74. At least a portion of the pawl body 70, the first shoulder 72, and the second shoulder 74 defines an opening 76. The pawl body 70 defines a tab 80 that extends away from the pawl body 70 in a first direction. The first shoulder 72 and the second shoulder 74 extend away from the pawl body 70 in a second direction that is disposed opposite the first direction. The first shoulder 72 defines a first shoulder opening 82 that is proximately aligned with the first pin opening 50. The second shoulder 74 defines a second shoulder opening 84 that is proximately aligned with the third pin opening 54. A first pin 86 extends through the first pin opening 50, the first shoulder opening 82, the second shoulder opening 84, and the third pin opening 54 to pivotally connect the first shoulder 72 and the second shoulder 74 of the pawl 22 to the first side plate 32 and the second side plate 34 of the base member 20.

The lock member 24 is spaced apart from the pawl 22. The lock member 24 is pivotally connected to the base member 20. The lock member 24 is disposed between the first side plate 32 and the second side plate 34. The lock member 24 is movable between a retracted position, as shown in FIG. 3, in which a majority of the lock member 24 is received within or disposed within the receiving region 60, and an extended position, as shown in FIGS. 1 and 5, in which the majority of the lock member 24 is disposed outside of the receiving region 60 and the lock member 24 is disposed in a non-perpendicular relationship and a non-parallel relationship to the floor 30 of the base member 20. The lock member 24 is configured to engage at least a portion of the pawl 22 while in the extended position.

The lock member 24 includes a lock member base 90, a first arm 92, and a second arm 94. The lock member base 90 is disposed generally parallel to the floor 30 of the base member 20. The first arm 92 and the second arm 94 extend from the lock member base 90 towards the pawl 22. The first arm 92 is spaced apart from and is disposed generally parallel to the second arm 94. At least one of the first arm 92 and the second arm 94 is configured to engage a portion of the pawl 22, such as the first shoulder 72 and the second shoulder 74 while the lock member 24 is in the extended position.

The first arm 92 defines a first arm opening 100 and a first slot 102. The first arm opening 100 is disposed proximate the lock member base 90. The first arm opening 100 is proximately aligned with the second pin opening 52. The first slot 102 extends from an interior surface of the first arm 92 towards an exterior surface of the first arm 92. The first slot 102 extends from the first arm opening 100 towards a tip of the first arm 92.

The second arm 94 defines a second arm opening 104 and the second slot 106. The second arm opening 104 is disposed proximate the lock member base 90. The second arm opening 104 is proximately aligned with the fourth pin opening 56. A second pin 110 extends through the second pin opening 52, the first arm opening 100, the second arm opening 104, and the fourth pin opening 56 to pivotally connect the first arm 92 and the second arm 94 of the lock member 24 to the first side plate 32 and the second side plate 34 of the base member 20. In at least one embodiment, the lock member base 90 defines an opening that extends completely through the lock member base 90 that is configured to receive the second pin 110 to pivotally connect the lock member 24 to the base member 20.

The second slot 106 extends from an interior surface of the second arm 94 towards an exterior surface of the second arm 94. The second slot 106 extends from the second arm opening 104 towards a tip of the second arm 94.

The actuator assembly 26 is drivably connected to the pawl 22 in the lock member 24. The actuator assembly 26 is arranged to move each of the pawl 22 and the lock member 24 between the retracted position and the extended position. The actuator assembly 26 includes a first shape memory alloy actuator 120 and a second shape memory alloy actuator 122.

The first shape memory alloy actuator 120 and the second shape memory alloy actuator 122 are made of a shape memory alloy that may be trained to respond whenever the shape memory alloy experiences a change in polarity within a predetermined temperature range. The change in polarity causes the first shape memory alloy actuator 120 and the second shape memory alloy actuator 122 to change shapes to move the pawl 22 and the lock member 24 between the retracted position and the extended position. The shape memory alloy selected may be trained or treated such that the shape memory alloy is stable within the temperature range of −40° C. to 50° C. for a specified polarity condition, such that a change in position or shape occurs within the temperature range and in response to a change in polarity.

The shape memory alloy exhibits different yielding behavior the shape memory alloy is in a martensitic or an austenitic state due to its pseudo elastic capabilities attributed to reversible phase change from austenitic to a self-oriented martensitic or stress induced martensitic. The change in the stress and/or strain of the shape memory alloy caused by the change in polarity, changes the shape of the shape memory alloy and replaces traditional torsional springs or other biasing members.

The first shape memory alloy actuator 120 and the second shape memory alloy actuator 122 may be selectively electrically driven by an electrical actuator that is operatively connected to a vehicle power system. The vehicle power system is configured to provide an electrical current or power to change the polarity of at least one of the first shape memory alloy actuator 120 and the second shape memory alloy actuator 122 to move the pawl 22 and the lock member 24 between the retracted position and the extended position.

The first shape memory alloy actuator 120 is drivably connected to the pawl 22. The first shape memory alloy actuator 120 is configured to move the pawl 22 between the retracted position and the extended position in response to a change in polarity provided by a source 124 that is operatively connected to the first shape memory alloy actuator 120.

The first shape memory alloy actuator 120 includes a first shape memory alloy member 130 that extends between a first shape memory alloy member first end 132 and the first shape memory alloy member second end 134. The first shape memory alloy member 130 is at least partially disposed between the first shoulder 72 and the second shoulder 74 of the pawl 22. The first shape memory alloy member 130 is disposed about the first pin 86. The first shape memory alloy member first end 132 is operatively connected to the floor 30 of the base member 20. The first shape memory alloy member second end 134 at least partially extends through the opening 76 of the pawl 22 and is configured to selectively engage the pawl body 70 of the pawl 22.

Figure 4:
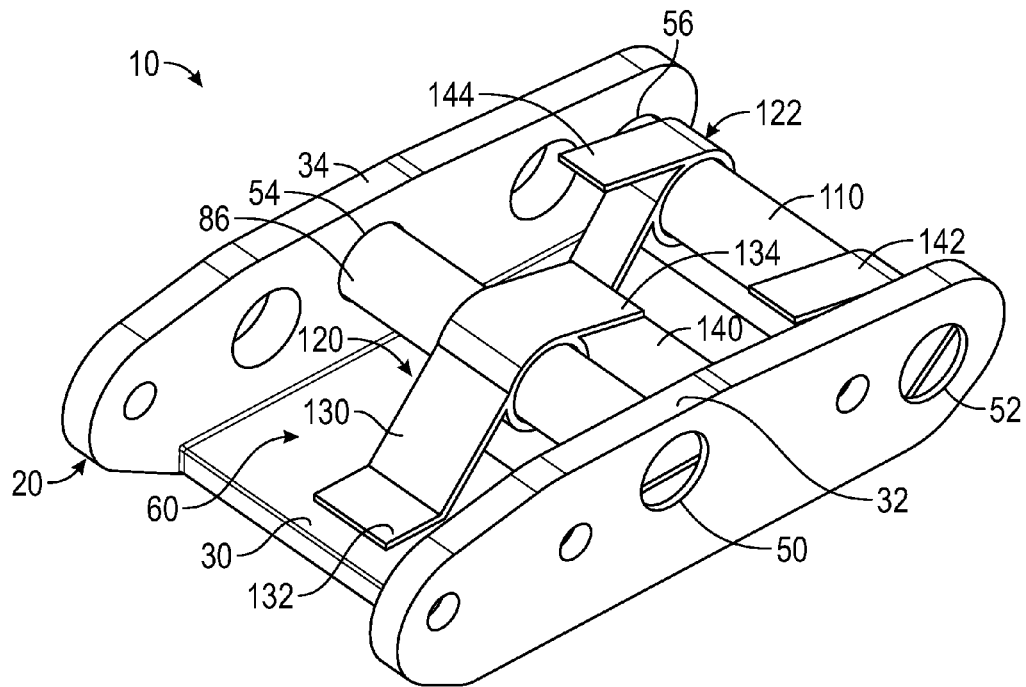
FIG. 4 is a perspective view of the restraint assembly in the retracted position with a pawl and a lock member removed for clarity.
Figure 6:
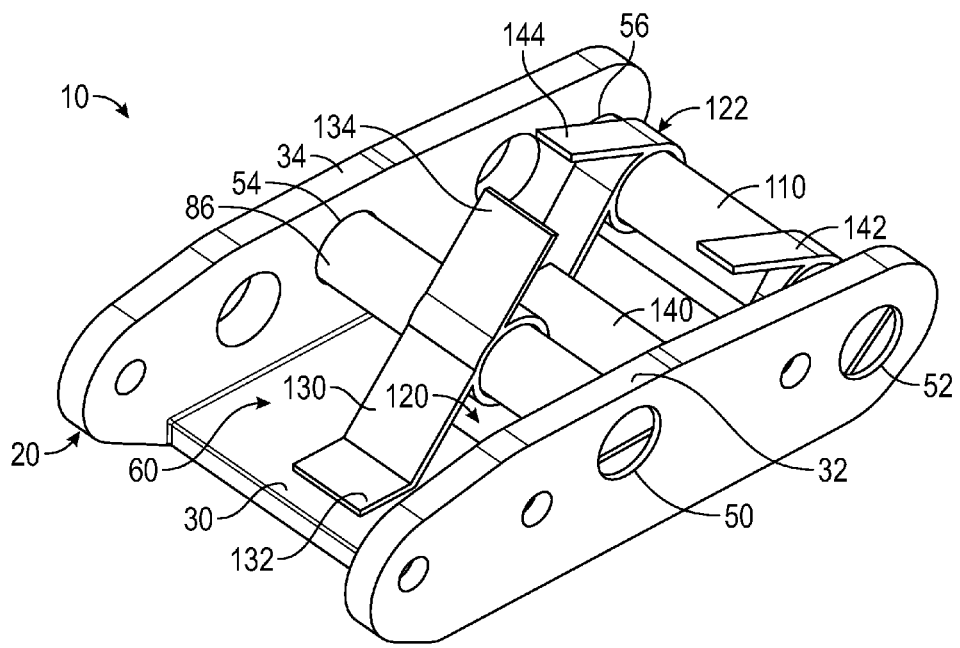
FIG. 6 is a perspective view of the restraint assembly in the extended position with the pawl and the lock member removed for clarity.

The first shape memory alloy member 130 is movable between a first shape, as shown in FIGS. 3 and 4, and a second shape, as shown in FIGS. 5 and 6, based on a change in the polarity of the first shape memory alloy member 130. The first shape of the first shape memory alloy member 130 corresponds to the retracted pawl position. The first shape memory alloy member first end 132 is disposed generally parallel to the first shape memory alloy member second end 134 while the first shape memory alloy member 130 is in the first shape. The second shape of the first shape memory alloy member 130 corresponds to the extended pawl position. The first shape memory alloy member first end 132 is disposed in a nonparallel relationship with the first shape memory alloy member second end 134 while the first shape memory alloy member 130 is in the second shape.

The second shape memory alloy actuator 122 is drivably connected to the lock member 24. The second shape memory alloy actuator 122 is configured to move the lock member between the retracted position and the extended position in response to a change in polarity provided by the source 124 that is operatively connected to the second shape memory alloy actuator 122.

The second shape memory alloy actuator 122 includes a base 140, a second shape memory alloy member 142, and a third shape memory alloy member 144. The base 140 is operatively connected to the floor 30 of the base member 20. The second shape memory alloy member 142 extends from the base 140 and is disposed about a portion of the second pin 110. The second shape memory alloy member 142 is configured to selectively engage the lock member 24. The second shape memory alloy member 142 is at least partially received within the first slot 102 of the first arm 92 of the lock member 24. The third shape memory alloy member 144 is spaced apart from the second shape memory alloy member 142. The third shape memory alloy member 144 extends from the base 140 and is disposed about a portion of the second pin 110. The third shape memory alloy member 144 is configured to selectively engage the lock member 24. The third shape memory alloy member 144 is at least partially received within the second slot 106 of the second arm 94 of the lock member 24.

The second shape memory alloy member 142 and the third shape memory alloy member 144 are movable between a third shape, as shown in FIGS. 3 and 4, and a fourth shape, as shown in FIGS. 5 and 6, based on a change in polarity of the second shape memory alloy member 142 and/or the third shape memory alloy member 144. The third shape of the second shape memory alloy member 142 and/or the third shape memory alloy member 144 corresponds to the retracted lock member position. Respective ends of the second shape memory alloy member 142 and the third shape memory alloy member 144 are disposed generally parallel to the base 140 while the second shape memory alloy member 142 and/or the third shape memory alloy member 144 are in the third shape. The fourth shape of the second shape memory alloy member 142 and/or the third shape memory alloy member 144 corresponds to the extended lock member position. Respective ends of the second shape memory alloy member 142 and the third shape memory alloy member 144 are disposed in a generally non-parallel relationship to the base 140 while the second shape memory alloy member 142 and/or the third shape memory alloy member 144 are in the third shape.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Throughout this specification, the term "attach," "attachment," "connected", "coupled," "coupling," "mount," or "mounting" shall be interpreted to mean that a structural component or element is in some manner connected to or contacts another element, either directly or indirectly through at least one intervening structural element, or is integrally formed with the other structural element.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A restraint assembly, comprising:
   a base member having a floor, a first side plate extending from the floor, and a second side plate extending from the floor;
   a pawl having a pawl body, a first shoulder extending from the pawl body and pivotally connected to the first side plate, and a second shoulder extending from the pawl body and pivotally connected to the second side plate;
   a lock member pivotally connected to the first side plate and the second side plate, the lock member has a lock member base, a first arm extending from the lock member base towards the pawl, and a second arm extending from the lock member base towards the pawl; and
   an actuator assembly drivably connected to the pawl and the lock member, the actuator assembly being arranged to move each of the pawl and the lock member between a retracted position and an extended position, at least one of the first arm and the second arm engages the pawl, while the pawl and the lock member are in the extending position, the actuator assembly including:
   a first shape memory alloy actuator including a first shape memory alloy member having a first shape memory alloy member first end operatively connected to the floor and a first shape memory alloy member second end configured to selectively engage the pawl body, and
   a second shape memory alloy actuator including:
      a second shape memory alloy member having a second shape memory alloy member first end operatively connected to a base disposed on the floor and a second shape memory alloy second end that engages the first arm, and
      a third shape memory alloy member having a third shape member alloy member first end operatively connected to the base disposed on the floor and a third shape memory alloy second end that engages the second arm.

2. The restraint assembly of claim 1, wherein the first shape memory alloy member extends at least partially through an opening defined between the first shoulder, the pawl body, and the second shoulder.

3. The restraint assembly of claim 1, wherein the first shape memory alloy member is movable between a first shape that corresponds to the retracted position of the pawl and a second shape that corresponds to the extended position of the pawl.

4. The restraint assembly of claim 3, wherein while the first shape memory alloy member is in the first shape, the first shape memory alloy member first end is disposed parallel to the first shape memory alloy member second end.

5. The restraint assembly of claim 3, wherein while the first shape memory alloy member is in the second shape, the first shape memory alloy member first end is disposed in a non-parallel relationship with the first shape memory alloy member second end.

6. A restraint assembly, comprising:
   a pawl having a pawl body, a first shoulder extending from the pawl body and pivotally connected to a first side plate of a base member, and a second shoulder extending from the pawl body and pivotally connected to a second side plate of the base member;
   a lock member pivotally connected to the first side plate and the second side plate, the lock member having a first arm and a second arm extending from a lock member base towards the pawl; and
   an actuator assembly arranged to move at least one of the pawl and the lock member between a retracted position and an extended position, comprising:
      a first shape memory alloy actuator including a first shape memory alloy member having a first shape memory alloy member first end operatively connected to a floor of the base member and a first shape memory alloy member second end configured to selectively engage the pawl body.

7. The restraint assembly of claim 6, wherein the first shape memory alloy actuator is arranged to move the pawl between the retracted position and the extended position in response to a change in polarity provided by a source that is operatively connected to the first shape memory alloy actuator.

8. The restraint assembly of claim 6, wherein the first shape memory alloy member is movable between a first shape that corresponds to the retracted position of the pawl and a second shape that corresponds to the extended position of the pawl.

9. The restraint assembly of claim 6, wherein the first shape memory alloy member extends at least partially through an opening defined between the first shoulder, the pawl body, and the second shoulder.

10. The restraint assembly of claim 6, wherein the actuator assembly further comprising:
   a second shape memory alloy actuator including a second shape memory alloy member having a second shape memory alloy member first end operatively connected to a base disposed on the floor and a second shape memory alloy second end that engages the first arm.

11. The restraint assembly of claim 10, wherein the second shape memory alloy actuator is arranged to move the lock member between the retracted position and the extended position in response to a change in polarity provided by a source that is operatively connected to the second shape memory alloy actuator.

12. The restraint assembly of claim 10, wherein the second shape memory alloy actuator further includes:
   a third shape memory alloy member having a third shape member alloy member first end operatively connected to the base disposed on the floor and a third shape memory alloy second end that engages the second arm.

* * * * *